Dec. 29, 1925.  
L. S. LACHMAN  
1,567,278  
COMPOSITE OR SKELETON METAL WORK AND METHOD OF PRODUCING THE SAME  
Filed August 24, 1923
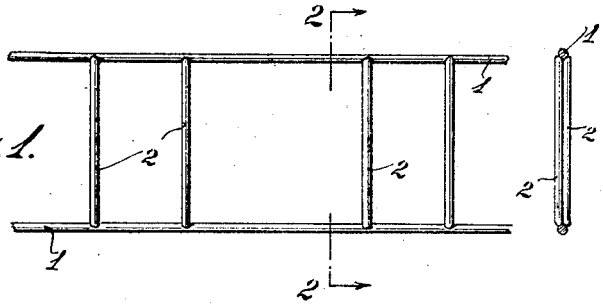
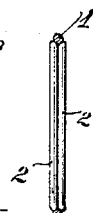
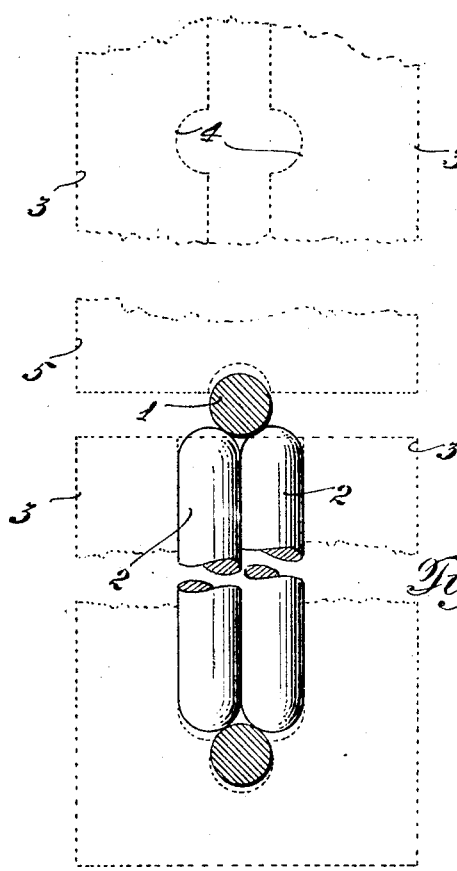
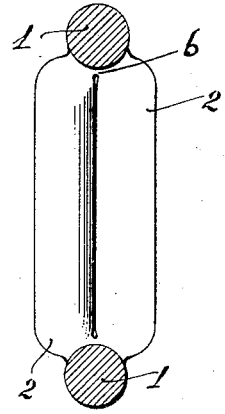
INVENTOR  
Laurence S. Lachman  
BY his ATTORNEYS  
Townsend & Decker Patented Dec. 29, 1925.

1,567,278

UNITED STATES PATENT OFFICE.

LAURENCE S. LACHMAN, OF NEW YORK, N. Y.

COMPOSITE OR SKELETON METAL WORK AND METHOD OF PRODUCING THE SAME.

Application filed August 24, 1923. Serial No. 659,046.

*To all whom it may concern:*

Be it known that I, LAURENCE S. LACHMAN, a citizen of the United States, and a resident of New York, in the county of New York and State of New York, have invented certain new and useful Improvements in Composite or Skeleton Metal Work and Methods of Producing the Same, of which the following is a specification.

My invention relates to composite metal work wherein the members or elements of which it is composed are united by welds produced by the electric resistance process wherein, as usual, pressure is applied at the heated junction to weld the same with an attendant upsetting of the metal immediately surrounding the joint.

One of the objects of my present invention is to provide metal work of the character indicated wherein the upset metal shall not be exposed.

My invention consists essentially of metal work in which one member comprises two pieces in immediate apposition but with a slight space between them at the point of weld adapted to receive another member, said other member being welded to the first in said space by heating by the electric resistance method and by pressure applied in the direction of the plane or line of division.

The invention further relates to the method of producing metal work of the character described.

Fig. 1 is a side elevation of a section of metal work to which my invention is applied.

Fig. 2 is a cross-section on the line 2—2 Fig. 1.

Fig. 3 is an enlarged view illustrating the manner of assembling the work in the welding apparatus preparatory to the application of heating current and pressure.

Fig. 4 is a section through the joint or weld of a sample of work to illustrate the disposition of the upset metal.

Referring to Fig. 1, 1 indicates longitudinal parallel members each of which may be considered as the one member of the work and 2 indicates the elements which are arranged in apposition and together constitute the other member welded to the first.

The Figs. 1 and 2 illustrate merely one of the various composite metal constructions in which my invention may be realized, it being understood that the members respectively may be assembled or related to one another as the members of a fence, grille, metal reinforcement, girder, lattice work or other fabricated work. Also, and as will be apparent from the subjoined description, either member may consist of the elements in apposition like the elements 2, 2.

According to my present invention the joint between the members is made in a space on the line of division or separation of the two elements of which one member is composed and the welding pressure is applied substantially on the line of division with the effect of locating the upset metal of the work along the line of division and practically within the outside compass or dimensions of the compound double element 2.

To produce a welded union of this character the members may be assembled as indicated in Fig. 3 wherein the elements 2 are placed preferably in immediate apposition or contact but with a slight space between them at their end where the electrical weld is to be formed, said space being provided preferably as will be herein presently described and said elements are held against separation or spreading transversely to the line of division or separation during the welding operation by locating them in grooves or semi-circular depressions 4 in the solid block or electrode 3. The block 3 may be the element whereby current is conveyed to the element 2 for heating the points of engagement or contact of the ends thereof with the other member indicated at 1. The latter is engaged by a suitable current supplying and pressure applying block or electrode 5 which may conveniently be supplied with a locating groove suitably conforming to the surface of the member or element 1.

The welding operation involves simply the supplying of heating current which passes across the points of contact of the element or member 1 with the two elements 2 comprising the other member of the composite construction, said element 1 being arranged to engage the element 2 in the space on the line of separation or division of the latter and the pressure being applied substantially parallel with or in a line coinciding with the line of division, while the elements 2 are, by suitable holding devices, prevented from moving away from one another.

The effect of this operation is to produce a joint of the character shown in Fig. 4 in which the welded or upset metal, roughly indicated at 6, is located in the space between the elements 2 and within the outside dimensions thereof and immediately contiguous to the sides of the member 1 where it is engaged with the elements 2. As will be seen, not only is the upset metal of the weld located in position where it will not readily contact with other objects during use of the product but also a joint of great firmness and strength is produced owing to the large area of welded metal involved.

Furthermore the space between the elements 2 provided by rounding the same or otherwise made by separating them slightly affords a socket or rest in which the member 1 may be received and by which it is held mechanically against lateral displacement so that detachment or displacement of the elements of the joint is effectually prevented by the cooperation of this mechanical feature and the weld effected in said space.

To provide a space for receiving a member or element 1 it is desirable to round or reduce the ends of the element 2 comprising the one member, as indicated in Fig. 3, thus not only aiding the development of heat by the resistance method, owing to the small surfaces of contact between them and the member 1, but also giving the joint a better finish.

While I have shown in the drawings the elements 2, 2 as in direct contact with one another it will be obvious that they may be arranged in more or less close apposition as desired and that, by slightly separating them while holding them from further movement away from one another, the tendency will be to more fully prevent the bur or upset metal from becoming exposed at the sides of the element 1 and causing said welded metal to locate itself in the space between the elements 2. Obviously this effect would result when the elements 2 are slightly separated even if the ends thereof are not rounded or reduced.

What I claim as my invention is:—

1. Composite metal work one member of which consists of two pieces of metal adjacent to one another but with a slight space between them at the point of weld and another member welded against the same in said space on the line of division or separation between the elements comprising the first-named member.

2. Composite metal work comprising a member consisting of two metal elements in apposition but with a slight space between them at their end and a second member side-welded in said space against the end of the elements comprising the first member as and for the purpose described.

3. The herein described method of producing composite metal work consisting in assembling two pieces of metal together in apposition but with a slight space between them at the place of weld to constitute one member, engaging the same in said space by the other member on the line of separation or division and applying pressure on the line of separation while the parts are heated by the electric resistance method.

4. Composite metal work comprising longitudinal members and crossing members the latter of which consist of two elements in apposition with a slight space between them at the place of welding and having the longitudinal members welded in said space on the line of separation or division as and for the purpose described.

5. The herein described method of producing composite metal work consisting of longitudinal members and members projecting therefrom at an angle, consisting in assembling two pieces of metal in apposition but with a slight space between them at the place of welding to form the latter-named members and welding the longitudinal members in the space between the ends of said pieces by pressure applied in a direction to tend to force the opposed elements apart while at the same time resisting their movement of separation.

6. The method of forming a welded joint in a member comprising two elements arranged side by side and another member, consisting in supporting said elements in separated relation with a slight space between them at the place of welding, applying the other member in said space on the line of separation and welding by the electric resistance method and pressure directed towards the space between said elements as and for the purpose described.

Signed at New York, in the county of New York and State of New York, this 23rd day of August, A. D. 1923.

LAURENCE S. LACHMAN.